United States Patent [19]

Knop

[11] Patent Number: 5,092,180
[45] Date of Patent: Mar. 3, 1992

[54] DEVICE FOR MEASURING DEFORMATIONS IN AN ELONGATED MACHINE COMPONENT, ESPECIALLY THE DOCTOR BEAM OF A COATER

[75] Inventor: Reinhard Knop, Bochum, Fed. Rep. of Germany

[73] Assignee: Jagenberg Aktiengesellschaft, Dusseldorf, Fed. Rep. of Germany

[21] Appl. No.: 552,662

[22] Filed: Jul. 16, 1990

[30] Foreign Application Priority Data

Sep. 5, 1989 [DE] Fed. Rep. of Germany ........ 3929458

[51] Int. Cl.[5] ...................... G01B 21/32; G01B 21/16; B05C 11/04
[52] U.S. Cl. ...................................... 73/849
[58] Field of Search ...................... 73/849, 862.62, 800, 73/788, 786; 118/712

[56] References Cited

U.S. PATENT DOCUMENTS

| | | | |
|---|---|---|---|
| 3,184,188 | 5/1965 | Rossire | 73/849 |
| 3,194,052 | 7/1965 | Melzer | 73/788 |
| 4,070,906 | 1/1978 | Rupert et al. | 73/786 |
| 4,463,254 | 7/1984 | Asawa et al. | 73/800 |
| 4,477,725 | 10/1984 | Asawa et al. | 73/800 |
| 4,636,638 | 1/1987 | Huang et al. | 73/800 |
| 4,788,868 | 12/1988 | Wilk | 73/800 |

FOREIGN PATENT DOCUMENTS

| | | |
|---|---|---|
| 84489 | 2/1895 | Fed. Rep. of Germany. |
| 2825907 | 7/1984 | Fed. Rep. of Germany. |
| 2171338 | 8/1986 | United Kingdom ................ 118/413 |

*Primary Examiner*—Willard Hoag
*Attorney, Agent, or Firm*—Sprung Horn Kramer & Woods

[57] ABSTRACT

A device for measuring deformations in an elongated machine component, especially the doctor beam of a coater. A strip that can be elastically deformed or is resiliently mounted longitudinally and is secured to the machine component only at its tensioned ends is tensioned independent and in a straight line at a distance from the machine component. A sensor that measures any variation in its distance away from the strip is rigidly mounted on the component between the two ends of the strip.

6 Claims, 2 Drawing Sheets

5,092,180

DEVICE FOR MEASURING DEFORMATIONS IN AN ELONGATED MACHINE COMPONENT, ESPECIALLY THE DOCTOR BEAM OF A COATER

BACKGROUND OF THE INVENTION

1. Field of the Invention

The invention concerns a device for measuring deformations in an elongated machine component, especially the doctor beam of a coater for coating webs of material, paper or cardboard for example.

2. Field of the Invention

Known paper and cardboard coaters have a coating-flow control mechanism in the form of a flexible doctor. The doctor is secured to a beam that extends over the width of the machine. Deformations in the doctor beam lead to irregularities in the cross-section of the coating and to coating results that cannot be reproduced. These deformations occur in the form of sagging for example due to the beam's inherent weight or to changes in temperature.

A coater with a doctor that rests on a batten secured to a pivoting beam is known from German Patent 2 825 907. The batten can be adjusted along the line of contact by tension and compression screws. Geometric errors in the doctor tension or support that lead to changes in the geometry of or pressure applied by the doctor and hence in the weight of the coating can accordingly be compensated for at the beginning of the coating operation. It is, however, impossible to directly measure the deformation of the doctor beam and hence to automatically compensate for errors before or during operation.

The object of the present invention is to provide a device that can constantly measure deformations in an elongated machine component, especially the doctor beam of a coater, during operation.

SUMMARY OF THE INVENTION

This object is attained by the instant modification of a device for measuring deformations in an elongated machine component, including a reference component that essentially extends along but is separated from the machine component and secured to it at each end and with a sensor that is positioned between the ends of the reference component and secured to the machine component, whereby the sensor reacts to a change in its distance from the reference component occasioned by a deformation in the machine component. Specifically the reference component comprises a strip which is freely tensioned in a straight line, which is elastically deformable or is resiliently mounted, and which is secured only at its tensioned ends to the machine component, the sensor being a remote sensor that extends into the vicinity of the surface of the strip and emits a signal that is proportional to the distance of the sensor from the strip.

The strip remains straight even when the machine component deforms, and accordingly functions as a straight reference line for the sensor that is displaced by the deformation to exploit.

Advantageously the strip is tensioned within a tube which is secured to the machine component at least at each end and in the middle, the sensor being secured to the tube in the vicinity of its middle securing point. The tube may be rotatable in holders on the machine component. The tube may contain a fluid for attenuating vibrations.

There may be provided an adjustable spring, the strip having one tensioning end mounted such that it can be displaced longitudinally against the force of the spring.

The device in accordance with the invention may be used in the flow control system of a coater for coating a web of material, especially paper or cardboard, that travels around a backing roller.

BRIEF DESCRIPTION OF THE DRAWINGS

One embodiment of the invention will now be described with reference to the simplified drawing, wherein.

DETAILED DESCRIPTION OF THE DRAWINGS

Figure 1:
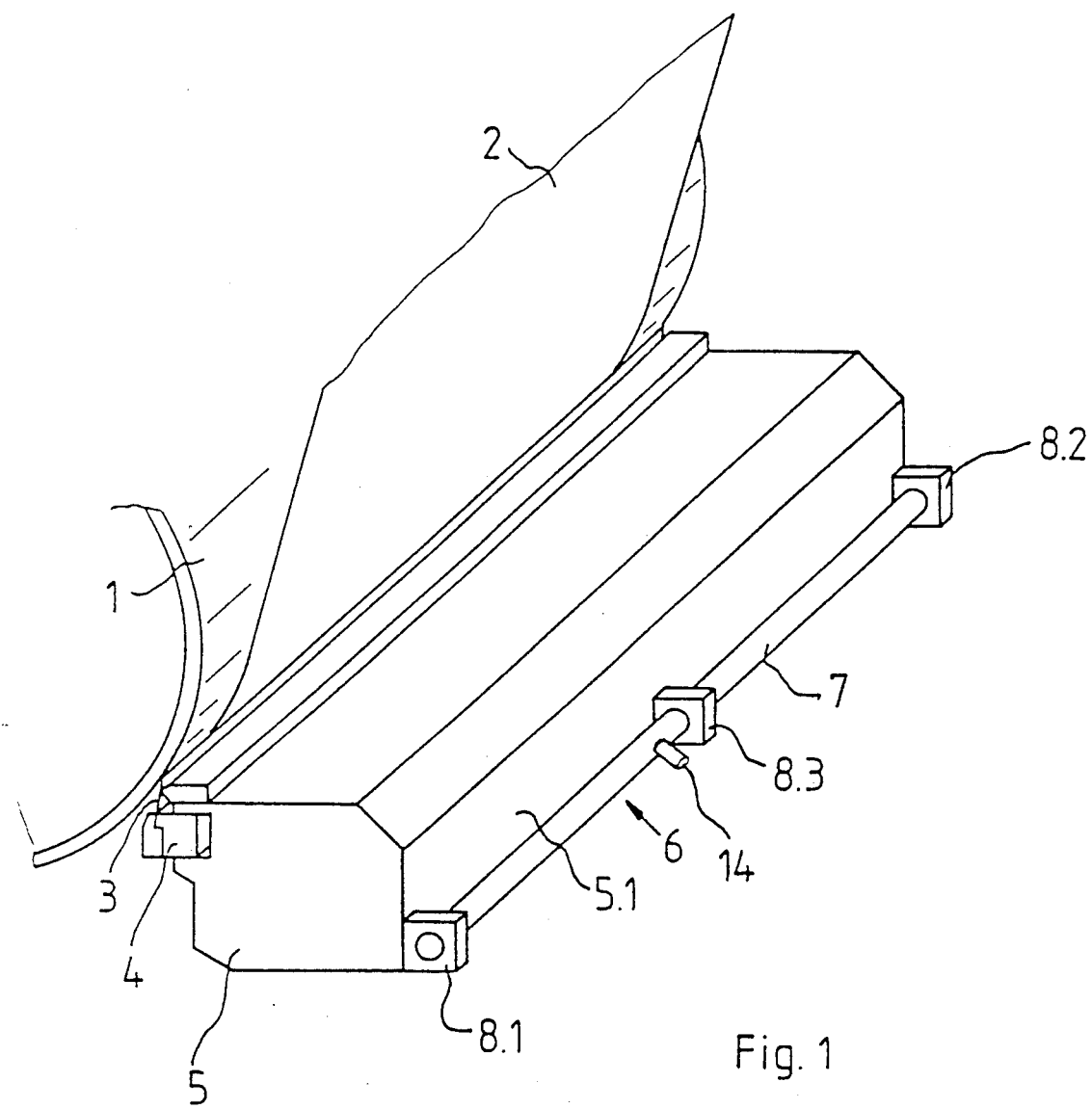
FIG. 1 is a schematic perspective view of a doctor beam with a device in accordance with the invention and FIG. 2 is a more or less horizontal longitudinal section through the device illustrated in FIG. 1.

The flow-control system illustrated in FIG. 1 is part of a coater for coating a web 2 of material, especially paper or cardboard, that travels around a backing roller 1. Liquid coating, colored for example, is applied in excess to web 2 by an unillustrated applicator and reduced to the desired weight per area or coating by the flow-control system.

The component of the system that actually controls the flow is a doctor 3 that rests with its edge against web 2 and with its base tensioned into a compression beam 4. Compression beam 4 slides back and forth in a doctor beam 5 that pivots in uprights at each side of the coater to establish a particular beam angle (the angle between the tangent to the backing roller and the undeformed doctor 3). A particular coating weight can be established by displacing compression beam 4 to appropriately tension doctor 3. A flow-control system of this type is known. It is described in German Patent 2 825 907 for example.

Figure 2:
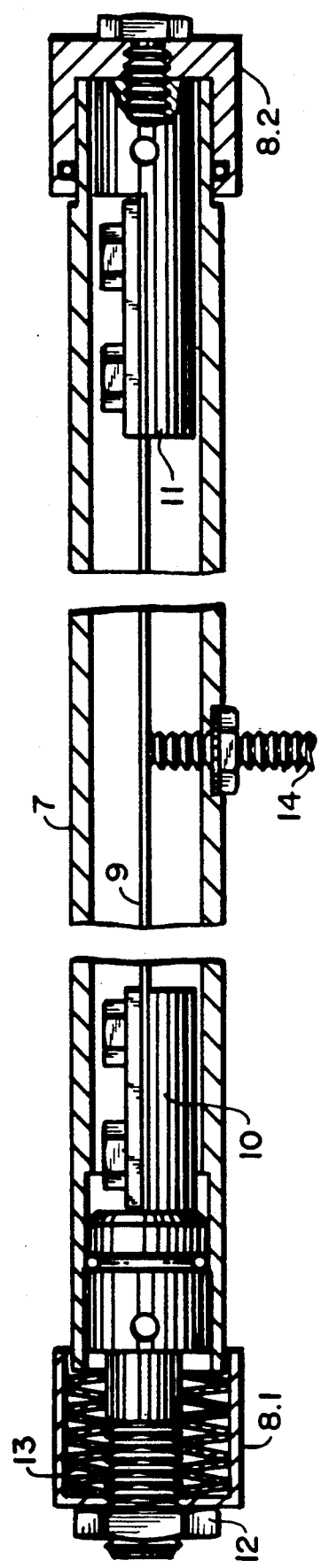

The deformation of doctor beam 5 toward doctor 3, radially in relation to backing roller 1, that is, is the parameter that most affects the tension on the doctor. That deformation is measured by a device 6 that extends over the operating width on the rear wall 5.1 of doctor beam 5. It is illustrated in detail in FIG. 2. Device 6 consists of a tube 7 that is secured to rear wall 5.1 by holders 8.1-8.3. Holders 8.1 and 8.2 are on each end and holder 8.3 more or less in the middle of doctor beam 5. They transmit the flection of doctor beam 5 to tube 7. Accommodated inside tube 7 is strip 9 of resilient steel that is tensioned in a straight line by fasteners 10 and 11. The fastener 10 at one end of the tube is secured by a setscrew such that it can be displaced outward against the force of a cup spring 13. This system makes it possible to apply tension to strip 9, preventing it from sagging to more than a negligible extent under its own weight. The strip acts as a straight reference line.

Secured to the wall at the midpoint of tube 7 is a commercially available remote sensor 14 that extends into the vicinity of the surface of strip 9 and emits a signal that is proportional to its distance therefrom.

Tube 7 participates in any flection on the part of doctor beam 5 while strip 9, which is separately tensioned inside the tube, remains straight. The distance between sensor 14 and strip 9 will accordingly change, and the change will be recorded by the sensor.

Tube 7 rotates along with strip 9 in holders 8.1-8.3, making it possible to set the device in that sensor 14 will register only the variations in distance that are perpendicular to the surface of strip 9.

When the device is employed with machine components that vibrate while in operation, tube 7 will contain a fluid that attenuates vibrations in strip 9. Tube 7 will protect sensor 14 and strip 9 from such impermissible external factors as the contamination that can result in coaters from excess liquid coating.

When the device is employed with machine components that do not generate any disruptive vibrations and are not exposed to contamination, strip 9 can be secured directly to the component with a tube. It is also possible when necessary to employ two devices at a right angle to each other, making it possible to simultaneously detect flections in two directions.

When employed on the doctor beam of a coater, it is preferable to utilize the device before going into production to align the beam precisely. This procedure will eliminate the need for complicated compensation of errors in the distribution of coating weight with a number of setscrews that act on the supporting batten. Device 6 will constantly measure any deformations in doctor beam 5 while the coater is in operation and will emit signals that can be used to activate automatic compensation mechanisms.

It will be understood that the specification and examples are illustrative but not limitative of the present invention and that other embodiments within the spirit and scope of the invention will suggest themselves to those skilled in the art.

What is claimed is:

1. In a device for measuring deformations in an elongated machine component, including a reference component that essentially extends along but is separated from the machine component and secured to it at each end and with a sensor that is positioned between the ends of the reference component and secured to the machine component, whereby the sensor reacts to a change in its distance from the reference component occasioned by a deformation in the machine component, the improvement wherein the reference component comprises a strip which is freely tensioned in a straight line, which is elastically deformable or is resiliently mounted, and which is secured only at its tensioned ends to the machine component, the sensor being a remote sensor that extends into the vicinity of the surface of the strip and emits a signal that is proportional to the distance of the sensor from the strip.

2. A device according to claim 1, including a tube in which the strip is tensioned independently, the tube being secured to the machine component at least at each end and in the middle, the sensor being secured to the tube in the vicinity of the its middle securing point.

3. A device according to claim 2, including holders on the machine component, the tube being rotatable in the holders.

4. A device according to claim 1, including an adjustable spring, the strip having one tensioning end mounted such that it can be displaced longitudinally against the force of the spring.

5. A device according to claim 2, including a fluid on the inside of tube, the fluid attenuating vibrations.

6. A coater for coating a web of material such as paper or cardboard including a doctor beam, and a device according to claim 1 or measuring the deformation of said beam.

* * * * *